(No Model.) 2 Sheets—Sheet 1.
H. R. MEYER.
UNDERGROUND CONDUIT FOR ELECTRICAL CONDUCTORS.
No. 274,213. Patented Mar. 20, 1883.
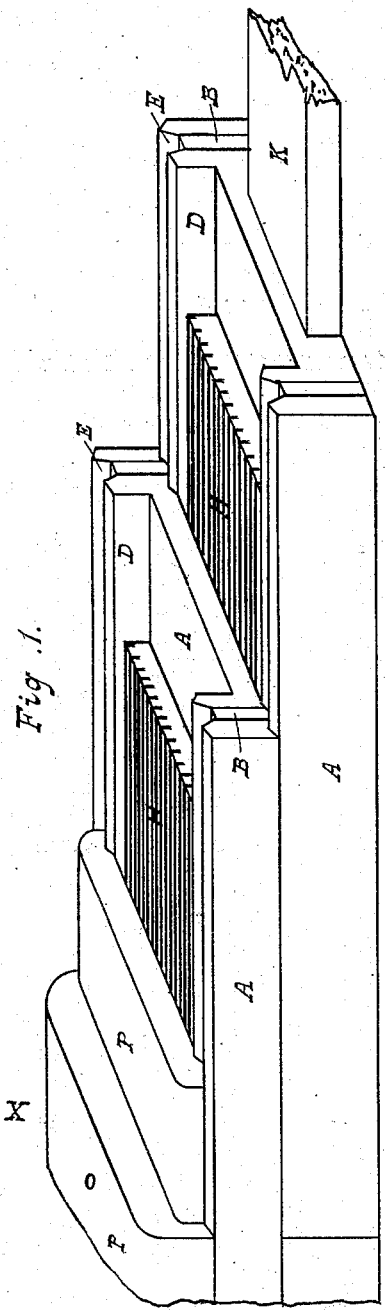
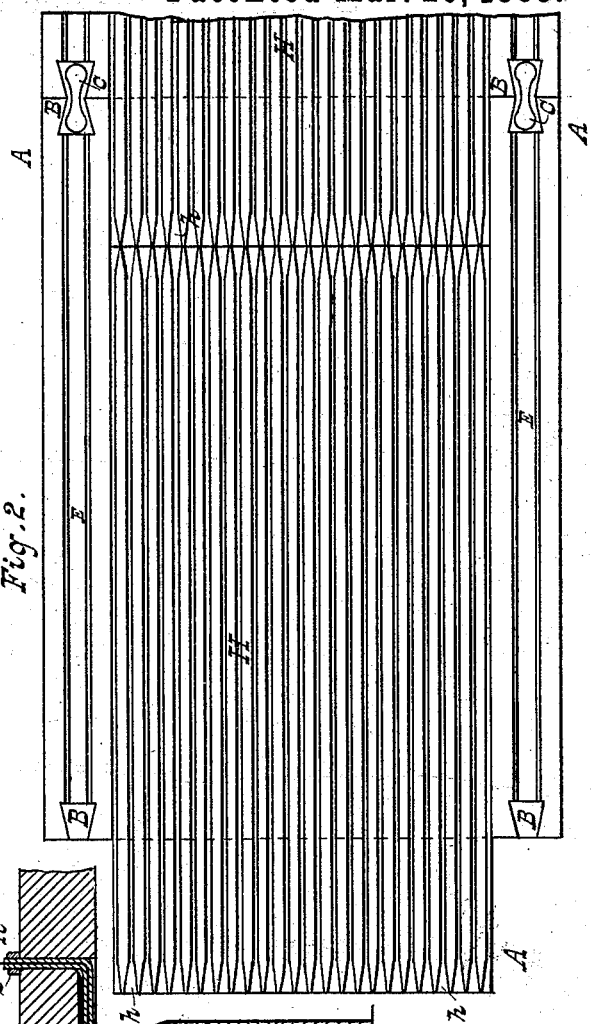
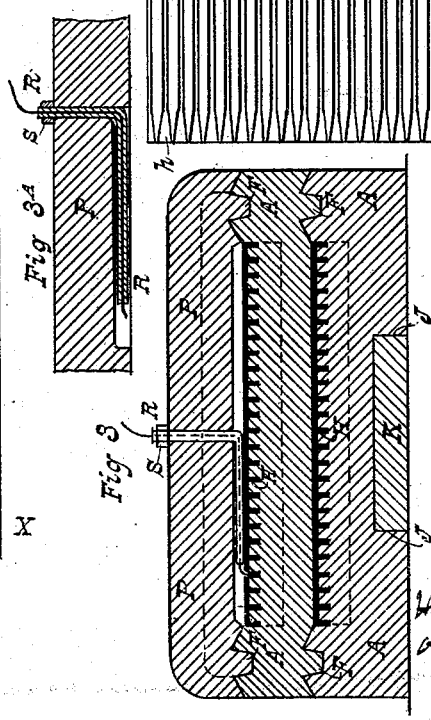
WITNESSES
INVENTOR (No Model.) 2 Sheets—Sheet 2.

H. R. MEYER.
UNDERGROUND CONDUIT FOR ELECTRICAL CONDUCTORS.

No. 274,213. Patented Mar. 20, 1883.

WITNESSES

INVENTOR
Henry Robert Meyer

UNITED STATES PATENT OFFICE.

HENRY ROBERT MEYER, OF LIVERPOOL, COUNTY OF LANCASTER, ENGLAND.

UNDERGROUND CONDUIT FOR ELECTRICAL CONDUCTORS.

SPECIFICATION forming part of Letters Patent No. 274,213, dated March 20, 1883.

Application filed April 3, 1882. (No model.) Patented in England January 17, 1882, No. 232.

*To all whom it may concern:*

Be it known that I, HENRY ROBERT MEYER, a subject of the Queen of Great Britain, and a resident of the city of Liverpool, in the county of Lancaster, in that part of the United Kingdom of Great Britain and Ireland called England, merchant, have invented a certain new and Improved Underground Conduit for Electric and Telephonic Conductors, (for which I have obtained Letters Patent for Great Britain No. 232, bearing date January 17, 1882;) and the following is a full, clear, and exact description of my invention, in such full, clear, and exact terms as to enable any one skilled in the art to which it appertains or with which it is most nearly connected to make and use the same, reference being had to the sheets of drawings annexed to this specification, and to the figures and letters of reference marked thereon, like letters being used to denote the same or corresponding parts throughout the various views.

My invention relates to an improved underground conduit or main for electric and telephonic conductors, such as wires or ribbons used for telegraphic, electric lighting, electric power, telephonic, and various other like purposes.

According to my invention I construct an underground conduit for electric and telephonic purposes in the following manner, reference being had to the drawings, in which—

Figure 5:
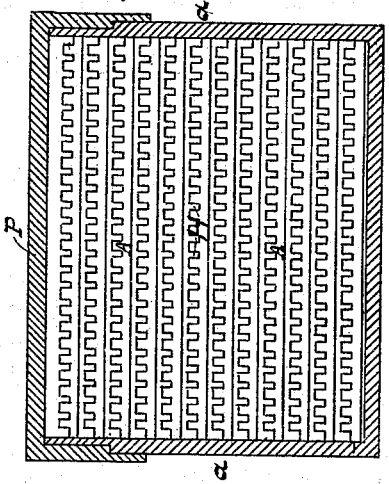
Figure 4:
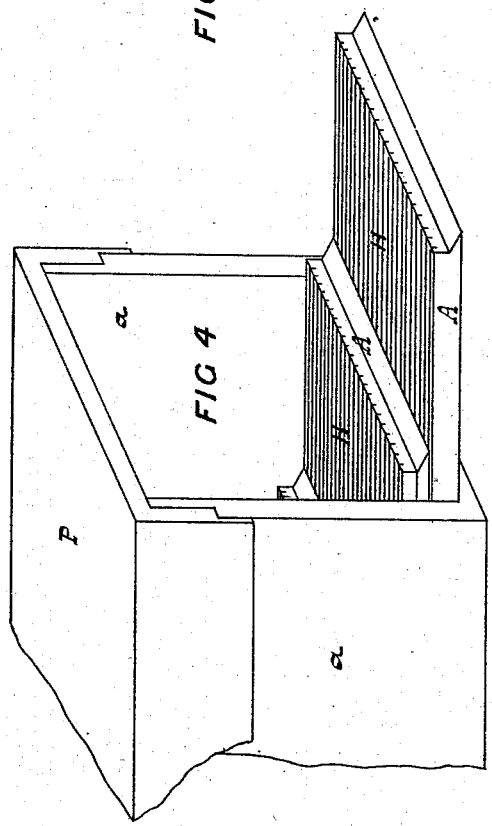
Figure 6:
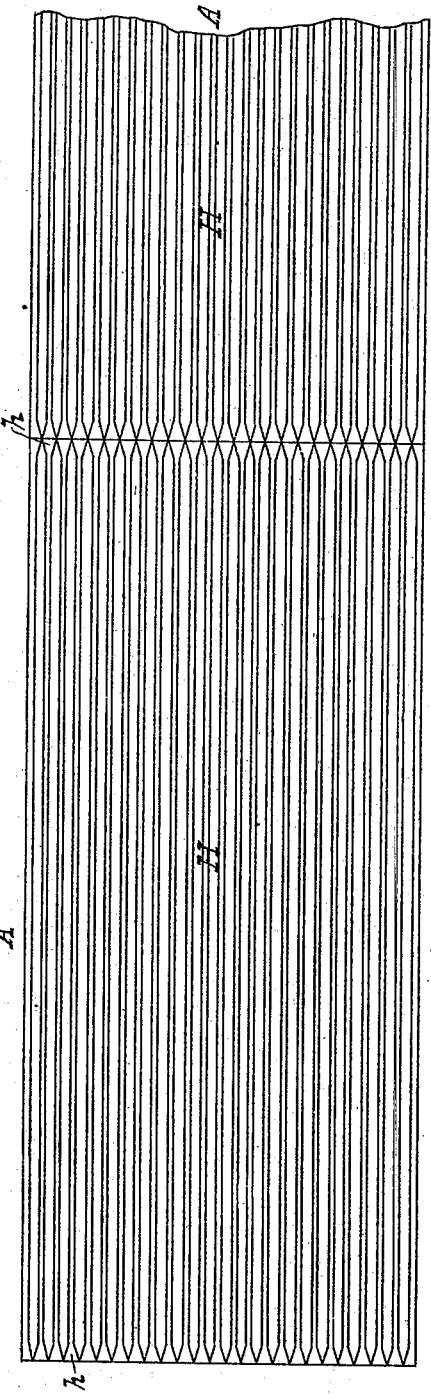

Figure 1 is a perspective view, illustrating an underground conduit according to my invention. Fig. 2 is a plan of the underground conduit with the cover removed. Fig. 3 is an end section of Fig. 1, taken at X X. Fig. 4 is a perspective view, showing another method of carrying out my invention. Fig. 5 is an end view of Fig. 4. Fig. 6 is a plan view of the slabs used in Fig. 4.

I use blocks, slabs, or channels A, formed of any suitable material. For example, the slabs A may be formed of glass, earthenware, porcelain, terra-cotta, cement, wood, or asphalt. I form the blocks, slabs, or channels A of any convenient section—for example, of a rectilinear section, as shown in the drawings. The blocks, slabs, or channels A are provided at each end with dovetail incisions B, and they are attached together by means of the key-pieces C, as hereinafter stated. The upper surface of the block, slab, or channel A is formed with side ridges, D, on which are formed the grooves E. The under surface of these side ridges, D, is formed with the tongues F—one on each side—which, when the slabs are in position, take into the grooves E, as shown. The upper surface of the blocks, slabs, or channels is provided with the longitudinal grooves H, which grooves H are used to receive the wires, ribbons, or other electric or telephonic conductors. The wires or ribbons are bedded and covered in the grooves H with a non-conducting material—for example, with asphalt, tar, pitch, resinous gums, cement, paraffine, felt, or stearines. I likewise cover all the butts and joints of the conduit or main with a similar non-conducting impermeable material. I form the lower block, slab, or channel A with a channel, J, on its under surface, and I bed the conduit upon a continuous wooden sleeper, K, which fits into the channel J. Over the top block, slab, or channel A, I provide a cover, P, formed with tongues F, which fit into the grooves E. Where the blocks, slabs, or channels join or butt together I form the ends of the blocks, slabs, or channels so that they lap-joint with each other, and each tier breaks joint with the tier above. The lengths of the cover P are also made to lap-joint, and are made to break joint with the upper block, slab, or channel A. Some of the blocks, slabs, or channels may be formed at an angle or in a curve, so as to be suitable for turning the corners of streets, and connecting one line of conduit with another.

To provide a means of attachment and connection for intermediate points where it may be necessary to connect with the electric or telephonic wires carried by the slabs A, I use the device R shown in detail at Fig. 3$^A$. This consists of a bent arm which passes up through the cover P, the under side of the cover having a semicircular recess to receive the arm. The wire is threaded through the arm, which is of length sufficient to radially reach any of the grooves H by turning the arm R round. The cover P is then placed in position over the arm or device R, and the arm is secured in position by the nut S. An impermeable substance—such as pitch or tar—is poured round the orifice in the cover P, to render the joint water-tight.

To provide for any unequalities that may occur in the continuous lining of the grooves H, I chamfer the edges of the ridges on either side of the grooves, as shown at $h$. By this arrangement I secure sufficient latitude to allow for any inequalities that may occur in the continuous lining.

In constructing a continuous underground conduit according to my invention, the under length of the slabs A is first laid, the slabs being connected together by the key-pieces C. The under length of slabs being in position, the wires or ribbons are bedded and covered in the grooves H with the asphalt or non-conducting compound. The next tier of slabs is placed over the ones just laid, and the second set of wires or ribbons are laid. When the requisite number of tiers has been placed the whole is surmounted by the cover P, all joints and connections being thoroughly paid and set with asphalt or other material.

It will be understood that in many cases—as, for example, when used for electric lighting—it is unnecessary for the whole number of tiers to run the whole distance. For instance, in three miles of lighting the upper tier will only run the first mile. The middle tier would then become the upper tier, and would have a total length of two miles, the under tier running the whole length of three miles, so that the cover would descend from the top tier to the bottom tier during the length, and wherever necessary during the length the connecting devices R are brought through the cover.

In the arrangement shown at Fig. 4, 5, and 6 I use the box-pipe $a$, which may be of iron or other suitable material. The slabs A are formed of glass or earthenware, and with the grooves H before spoken of. The slabs with the wires or ribbons are placed in the box $a$, one over the other, embedded in asphalt or other non-conducting material.

Having now described my invention and shown how the same may be put into operation, what I claim as my invention, and desire to secure by Letters Patent, is—

A continuous underground conduit for electric and telephonic conductors, consisting of a continuous bed-piece, K, a series of superposed grooved slabs, A, each forming a separate series of conduits, and a cover, P, the grooved slabs having tongued and grooved side pieces, and being dovetailed together, substantially as described.

In witness whereof I, the said HENRY ROBERT MEYER, have hereunto set my hand and seal this 9th day of March, in the year of our Lord 1882.

HENRY ROBERT MEYER. [L. S.]

Witnesses:
  FREDERICK JOHN CHEESBROUGH,
  JOHN HAMILTON REDMOND,
*Both of 15 Water Street, Liverpool, England.*